US012346056B2

(12) United States Patent
Josiah et al.

(10) Patent No.: US 12,346,056 B2
(45) Date of Patent: *Jul. 1, 2025

(54) METHOD AND SYSTEM FOR CONVERTING A TONER CARTRIDGE PRINTER

(71) Applicant: UI Technologies, Inc., Las Vegas, CA (US)

(72) Inventors: Michael Raymond Josiah, North Patchogue, NY (US); Joseph Dovi, Lake Grove, NY (US)

(73) Assignee: UI Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,276

(22) Filed: Oct. 3, 2023

(65) Prior Publication Data

US 2024/0027954 A1 Jan. 25, 2024

Related U.S. Application Data

(63) Continuation-in-part of application No. 17/683,865, filed on Mar. 1, 2022, now Pat. No. 11,829,098, (Continued)

(51) Int. Cl.
*G03G 21/18* (2006.01)
*G03G 15/00* (2006.01)
(Continued)

(52) U.S. Cl.
CPC ....... *G03G 21/181* (2013.01); *G03G 15/0121* (2013.01); *G03G 15/0863* (2013.01); (Continued)

(58) Field of Classification Search
CPC ........... G03G 15/6585; G03G 15/5087; G03G 15/0121; G03G 15/0894; G03G 15/0178; (Continued)

(56) References Cited

U.S. PATENT DOCUMENTS

2013/0108345 A1* 5/2013 Yamamoto ......... G03G 15/5087 400/76
2015/0093553 A1* 4/2015 Tyagi ..................... G03G 15/01 428/207

* cited by examiner

*Primary Examiner* — Jessica L Eley
(74) *Attorney, Agent, or Firm* — Kevin Schraven; Anooj Patel; Hankin Patent Law, APC

(57) ABSTRACT

A method of converting a CMYK Standard Color Printer to a CMYW Converted White Printer, comprising the steps: providing a CMYK Standard Color Printer; wherein a CMYK Standard Color Printer comprises: a black toner cartridge; wherein the black toner cartridge is installed in toner cartridge slot one; removing the black toner cartridge from the CMYK Standard Color Printer, such that the toner cartridge slot one is empty toner cartridge slot one; providing a white toner cartridge; wherein the white toner cartridge is configured to fit into the empty toner cartridge slot one; installing the white toner cartridge into the empty toner cartridge slot one; and providing raster image processor (RIP) software, such that the CMYK Standard Color Printer is configured to incorporate the white toner into one or more images printed by the CMYK Standard Color Printer in a single pass such that a CMYW Converted White Printer is created.

17 Claims, 4 Drawing Sheets

Related U.S. Application Data which is a continuation-in-part of application No. 17/238,821, filed on Apr. 23, 2021, now Pat. No. 11,415,911, and a continuation-in-part of application No. 17/331,412, filed on May 26, 2021, now Pat. No. 11,442,402, which is a continuation of application No. 17/194,620, filed on Mar. 8, 2021, now Pat. No. 11,526,122, which is a continuation-in-part of application No. 17/079,151, filed on Oct. 23, 2020, now Pat. No. 11,409,207, which is a continuation-in-part of application No. 16/402,718, filed on May 3, 2019, now abandoned, and a continuation-in-part of application No. 15/800,482, filed on Nov. 1, 2017, now Pat. No. 10,310,446, and a continuation of application No. 15/722,562, filed on Oct. 2, 2017, now Pat. No. 10,324,395, said application No. 15/800,482 is a continuation-in-part of application No. 15/408,186, filed on Jan. 17, 2017, now Pat. No. 9,835,968, and a continuation-in-part of application No. 15/286,998, filed on Oct. 6, 2016, now Pat. No. 9,835,983, and a continuation of application No. 15/286,943, filed on Oct. 6, 2016, now Pat. No. 9,835,982, and a continuation-in-part of application No. 15/286,875, filed on Oct. 6, 2016, now Pat. No. 9,835,981, and a continuation-in-part of application No. 14/879,548, filed on Oct. 9, 2015, now Pat. No. 9,488,932, and a continuation-in-part of application No. 14/731,785, filed on Jun. 5, 2015, now Pat. No. 9,383,684, said application No. 16/402,718 is a continuation-in-part of application No. 15/994,750, filed on May 31, 2018, now Pat. No. 10,649,372, which is a continuation of application No. 15/722,503, filed on Oct. 2, 2017, now Pat. No. 10,228,637, and a continuation-in-part of application No. 15/800,482, filed on Nov. 1, 2017, now Pat. No. 10,310,446.

(60) Provisional application No. 62/470,639, filed on Mar. 13, 2017.

(51) Int. Cl.
*G03G 15/01* (2006.01)
*G03G 15/08* (2006.01)

(52) U.S. Cl.
CPC ..... *G03G 15/0877* (2013.01); *G03G 15/6585* (2013.01); *G03G 15/0178* (2013.01)

(58) Field of Classification Search
CPC ..... G03G 2215/00987; G03G 15/0877; G03G 15/0863; G03G 21/181
See application file for complete search history.

METHOD AND SYSTEM FOR CONVERTING A TONER CARTRIDGE PRINTER

CROSS-REFERENCE TO RELATED APPLICATIONS

This patent application is a Continuation in Part of U.S. patent application Ser. No. 17/683,865, titled Method and System for Converting a Toner Cartridge Printer, filed on Mar. 1, 2022, now U.S. Pat. No. ________, the contents of which are expressly incorporated herein by this reference as though set forth in their entirety and to which priority is claimed. U.S. patent application Ser. No. 17/683,865 is a Continuation in Part of (1) U.S. application Ser. No. 17/238,821, titled Method For Converting Developer In a Toner cartridge, filed on Apr. 23, 2021, now U.S. Pat. No. 11,415,911, and (2) Ser. No. 17/331,412, titled Method and System For Converting A Toner Cartridge Printer, filed on May 26, 2021, now U.S. Pat. No. 11,442,402, the contents of both of which are expressly incorporated herein by this reference as though set forth in their entirety and to which priority is claimed. U.S. patent application Ser. No. 17,331,412 is a Continuation Application of U.S. patent application Ser. No. 17/194,620, titled A Method For Converting A Toner Cartridge, filed on Mar. 8, 2021, now U.S. Pat. No. 11,526,122, the contents of which are expressly incorporated herein by this reference as though set forth in their entirety and to which priority is claimed. U.S. patent application Ser. No. 17/194,620 is a Continuation-in-Part Application of U.S. patent application Ser. No. 17/079,151, titled A Method For Converting A Toner Cartridge, filed on Oct. 23, 2020, now U.S. Pat. No. 11,409,207, the contents of which are expressly incorporated herein by this incorporated herein by this reference as though set forth in their entirety and to which priority is claimed. U.S. patent application Ser. No. 17/079,151 is a Continuation-in-Part Application of U.S. patent application Ser. No. 16/402,718, titled Method For Converting A Toner Cartridge Printer To A Security Toner Printer, filed on May 3, 2019, the contents of which are expressly incorporated herein by this incorporated herein by this reference as though set forth in their entirety and to which priority is claimed. U.S. patent application Ser. No. 16/402,718 is a Continuation-in-Part Application of U.S. patent application Ser. No. 15/800,482, titled Method For Converting A Toner Cartridge Printer To A Sublimation Toner Printer, filed on Nov. 1, 2017, now U.S. Pat. No. 10,310,446, the contents of which are expressly incorporated herein by this reference as though set forth in their entirety and to which priority is claimed. U.S. patent application Ser. No. 15/800,482 takes priority from U.S. Provisional Patent Application No. 62/470,639, filed on Mar. 13, 2017, titled Toner Cartridge Printer Devices, Systems, and Methods, the contents of which are expressly incorporated herein by this reference as though set forth in their entirety and to which priority is claimed. U.S. patent application Ser. No. 16/402,718 is also a Continuation-in-Part Application of U.S. patent application Ser. No. 15/722,562, titled Toner Cartridge Printer Devices, Systems, And Methods For Under Printing, filed on Oct. 2, 2017, now U.S. Pat. No. 10,324,395, the contents of which are expressly incorporated herein by this reference as though set forth in their entirety and to which priority is claimed. U.S. patent application Ser. No. 15,800,482, is a Continuation-in-Part of the following U.S. patent application Nos., which means that this U.S. patent application is also a Continuation in Part of the following U.S. patent application Ser. Nos.: (1) Ser. No. 15/408,186, filed on Jan. 17, 2017, titled, Toner Cartridge Printer Devices, Systems, and Methods For Over Printing and Under Printing, now U.S. Pat. No. 9,835,968; (2) Ser. No. 15/286,998, filed on Oct. 6, 2016, titled, Method and System for Converting a Toner Cartridge Printer to a Double White Toner Printer, now U.S. Pat. No. 9,835,983; (3) Ser. No. 15/286,943, filed on Oct. 6, 2016, titled Method And System For Converting A Toner Cartridge Printer To A White, Clear, Metallic, Fluorescent, Or Light Toner Printer, now U.S. Pat. No. 9,835,982; (4) Ser. No. 15/286,875, filed on Oct. 6, 2016, titled, Method and System for Converting a Toner Cartridge Printer to a Metallic, Clear Fluorescent, or Light Toner Printer, now U.S. Pat. No. 9,835,981; (5) Ser. No. 14/879,548, filed on Oct. 9, 2015, titled, Method and System for Converting a Toner Cartridge Printer to a White, Clear, or Fluorescent Toner Printer, now U.S. Pat. No. 9,488,932; (6) Ser. No. 14/731,785, filed on Jun. 5, 2015, titled, Method and System for Converting a Toner Cartridge Printer to a White Toner Printer now U.S. Pat. No. 9,383,684, the contents of all of which are expressly incorporated herein by this reference as though set forth in their entirety and to which priority is claimed as Continuation-in-Part. U.S. patent application Ser. No. 16/402,718 is also a Continuation-in-Part Application of U.S. patent application Ser. No. 15/994,750, titled Method And System For Converting A Toner Cartridge Printer, filed on May 31, 2018, now U.S. Pat. No. 10,649,372, the contents of which are expressly incorporated herein by this reference as though set forth in their entirety and to which priority is claimed. U.S. patent application Ser. No. 15/994,750, is a Continuation-in-Part of U.S. patent application Ser. No. 15/722,503, filed on Oct. 2, 2017, titled Method And System For Converting A Toner Cartridge Printer To A Metallic Or Light Toner Printer, now U.S. Pat. No. 10,228,637. U.S. patent application Ser. No. 15/994,750, is a Continuation-in-Part of U.S. patent application Ser. No. 15/800,482, filed on Nov. 1, 2017, titled Method for Converting a Toner Cartridge Printer to a Sublimation Toner Printer, now U.S. Pat. No. 10,310,446.

FIELD OF USE

The present disclosure relates generally to printer cartridge replacement. More specifically, this disclosure relates to methods and systems of converting a standard toner cartridge printer to a printer that prints with white toner.

BACKGROUND

Traditional Cyan (C), Magenta (M), Yellow (Y), and Black (K) (or CMYK) laser or Light Emitting Diode (LED) type printers come standard with Cyan, Magenta, Yellow, and Black toner and/or drum cartridges. However, traditional black toner printers and CMYK toner printers are generally unable to be converted to print with toner other than cyan, magenta, yellow, and black, as these printers lack the appropriate toner and/or drum cartridges and the appropriate raster image processor (RIP) software for printing cartridge re-mapping. Re-mapping does not physically change where the cartridge slots are, instead it updates the printer to recognize that a specific cartridge slot that is usually one color is now a different color. The software then allows the printer to incorporate the new color into the images, such that the images printed are the correct and desired colors.

Printing in white toner is feasible through the use of white toner printers and would generally allow a user to print on dark or clear media. Still, white media printers are dedicated to CMYW only, where white is always the top color. This system does not allow printing on clear or dark media and may require the user to buy an entirely new printer. Printers that print both in white and color are CMYKW printers with a minimum of five toner printing cartridges, and white is always the last cartridge.

Thus, there is a need for a system and method for converting a standard CMYK (four-cartridge) toner printer to print using a non-standard color, such as white, clear, or fluorescent.

SUMMARY

To minimize the limitations in the cited references, and to minimize other limitations that will become apparent upon reading and understanding the present specification, the toner printer converting, refilling, and refurbishment systems and methods disclosed herein preferably allow a user to convert a standard printer into one that prints using non-standard toner, including white, clear, clear fluorescent, fluorescent, metallic gold, metallic silver, light colors, ceramic toners, security toners, and sublimation toners. Examples of standard printers will be a printer selected from the group of printers comprising: Ricoh® M C250FW, Ricoh® M C250FWB, Ricoh® P C311W, and Ricoh® M C251FW. UNINET® ICOLOR® 560 printers will be examples of converted white printers of the present disclosure.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In various embodiments, the methods and systems may be used to convert a traditional toner cartridge(s) and/or drum(s) printing machine to a printing machine that prints white, clear, and other non-standard toner colors.

One embodiment may be a method of converting a CMYK Standard Color Printer to a CMYW Converted White Printer, comprising the steps: providing a CMYK Standard Color Printer; wherein the CMYK Standard Color Printer comprises: a black toner cartridge; wherein the black toner cartridge is installed in a first toner cartridge slot; removing the black toner cartridge from the CMYK Standard Color Printer, such that the first toner cartridge slot is empty; providing a white toner cartridge; installing the white toner cartridge into the empty first toner cartridge slot one; and providing raster image processor (RIP) software, such that the CMYK Standard Color Printer may be configured to incorporate a white toner into one or more images printed by the CMYK Standard Color Printer in a single pass and such that a CMYW Converted White Printer is created; wherein the CMYK Standard Color Printer may be a printer selected from the group of printers comprising: Ricoh® M C250FW, Ricoh® M C250FWB, Ricoh® P C311W, and Ricoh® M C251FW. The CMYK Standard Color Printer may further comprise: four toner cartridges, the black toner cartridge, a cyan toner cartridge, a magenta toner cartridge, and a yellow toner cartridge; and four toner cartridge slots, a first toner cartridge slot, a second toner cartridge slot, a third toner cartridge slot, and a fourth toner cartridge slot. The cyan toner cartridge may be installed in the fourth toner cartridge slot, the magenta toner cartridge may be installed in the third toner cartridge slot, the yellow toner cartridge may be installed in the second toner cartridge slot. The RIP software may allow for remapping of the CMYK Standard Color Printer. The RIP software allows a black color to be printed using a combination of the cyan toner cartridge, the magenta toner cartridge, and the yellow toner cartridge. The CMYW Converted White Printer may be configured to print a layer of the white toner under the one or more images printed in a single pass.

Another embodiment may be a method of converting a CMYK Standard Color Printer to a WMYC Converted White Printer, comprising: providing a CMYK Standard Color Printer; wherein the CMYK Standard Color Printer comprises: a black toner cartridge and a cyan toner cartridge; wherein the cyan toner cartridge may be installed in a fourth toner cartridge slot and the black toner cartridge may be installed in a first toner cartridge slot; removing the black toner cartridge from the CMYK Standard Color Printer, such that the first toner cartridge slot may be empty; removing the cyan toner cartridge from the CMYK Standard Color Printer, such that the fourth toner cartridge slot may be empty; providing a white toner cartridge; installing the white toner cartridge into the empty fourth toner cartridge slot; installing the cyan toner cartridge into the empty first toner cartridge slot; and providing raster image processor (RIP) software, such that the CMYK Standard Color Printer may be configured to incorporate a white toner into one or more images printed by the CMYK Standard Color Printer in a single pass and such that a WMYC Converted White Printer is created; wherein the CMYK Standard Color Printer may be a printer selected from the group of printers comprising: Ricoh® M C250FW, Ricoh® M C250FWB, Ricoh® P C311W, and Ricoh® M C251FW.

The CMYK Standard Color Printer further comprises: four toner cartridges, the first toner cartridge slot, a second toner cartridge slot, a third toner cartridge slot, and the fourth toner cartridge slot; and four toner cartridge slots, the black toner cartridge, the cyan toner cartridge, a magenta toner cartridge, and a yellow toner cartridge. The magenta toner cartridge may be installed in the third toner cartridge slot, the yellow toner cartridge may be installed in the second toner cartridge slot. The RIP software allows for remapping of the CMYK Standard Color Printer. The RIP software allows a black color to be printed using a combination of the cyan toner cartridge, the magenta toner cartridge, and the yellow toner cartridge. The CMYW Converted White Printer may be configured to print a layer of white toner over the one or more images printed in a single pass.

Another embodiment may be a method of converting a CMYK Standard Color Printer, comprising the steps: providing a CMYK Standard Color Printer; converting the CMYK Standard Color Printer to print with a non-standard toner; and providing raster image processor (RIP) software, such that the CMYK Standard Color Printer may be configured to incorporate the non-standard toner into one or more images printed by the CMYK Standard Color Printer in a single pass. The non-standard toner may be selected from the group of toners comprising: clear; fluorescent clear; dye sublimation; metallic; and security. The RIP software may allow for remapping of the CMYK Standard Color Printer. The RIP software may allow a black color to be printed using a combination of the cyan toner cartridge, the magenta toner cartridge, and the yellow toner cartridge. The CMYK Standard Color Printer may be a printer selected from the group of printers comprising: Ricoh® M C250FW, Ricoh® M C250FWB, Ricoh® P C311W, and Ricoh® M C251FW.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
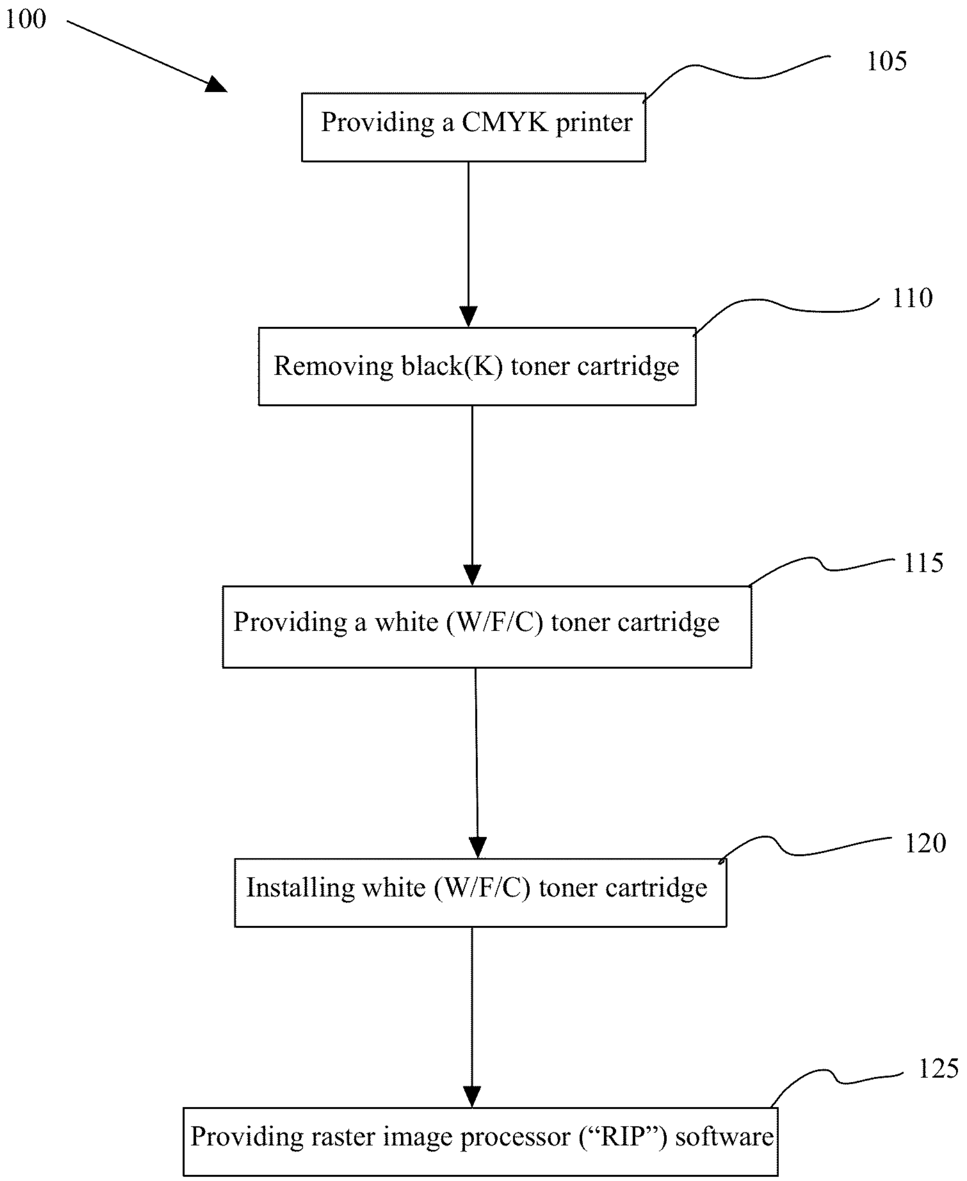
FIG. 1 is a flow block diagram of one embodiment of a method of converting a CMYK standard color printer to a CMYW converted white printer.

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the devices, systems, and methods of the present disclosure will become apparent to those skilled in the art from the following detailed description, which shows and describes illustrative embodiments of the devices, systems, and methods of the present disclosure. As will be realized, the devices, systems, and methods of the present disclosure are capable of modifications in various obvious aspects, all without departing from the spirit and scope of the present disclosure. Accordingly, the screenshot figures, and the detailed descriptions thereof, are to be regarded as illustrative in nature and not restrictive. Also, the reference or non-reference to a particular embodiment of the devices, systems, and methods of the present disclosure shall not be interpreted to limit the scope of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Furthermore, the one or more versions may be implemented as a method, apparatus, or article of manufacture using standard programming and/or engineering techniques to produce entirely hardware embodiment, an entirely software embodiment, or an embodiment combining software and hardware embodiments. Furthermore, the systems and methods may take the form of Non-transitory computer readable media. More particularly, the present methods and systems may take the form of web-implemented computer software or a computer program product. Any suitable computer-readable storage medium may be utilized including, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick).

Those skilled in the art will recognize many modifications may be made to this configuration without departing from the scope of the disclosed embodiments.

Embodiments of the systems and methods are described below with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of the various embodiments of the device, method, and/or system. For example, as used herein, the terms "computer" and "computer system" generally refer to any device that processes information with an integrated circuit chip and/or central processing unit (CPU).

As used herein, the terms "software" and "application" refer to any set of machine-readable instructions on a machine, web interface, and/or computer system" that directs a computer's processor to perform specific steps, processes, or operations disclosed herein.

As used herein, the term "computer-readable medium" refers to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer-readable medium. In various embodiments, a computer-readable storage medium may also be able to store data, which is able to be accessed by the processor of the computer system.

In the following description, certain terminology is used to describe certain features of one or more embodiments. For purposes of the specification, unless otherwise specified, the term "toner cartridge(s)" generally refers to a toner cartridge, a laser toner cartridge, an LED toner cartridge, a drum cartridge, and/or a combined toner and drum cartridge.

As used herein, the term "toner" generally refers to a powder, particulate, or dry ink that is used in laser printers, printers, and printing machines to form the printed text and images on the medium being printed. Generally, toner particles are melted by the heat of a fuser and bound to the media.

Regarding a CMYK printer, the letter "k" preferably stands for black.

Regarding a CMYKW printer, the letter "W" preferably stands for white but may also refer to a non-standard toner or toner color, such as white, clear, fluorescent, light, or pastel colors, and/or metallic.

The present specification discloses a system and method for converting a toner cartridge printer to a non-standard toner printer. The method and system for converting a toner cartridge printer to a non-standard toner printer preferably requires no special or dedicated printer drivers.

The present method and system for converting a toner cartridge printer to a white, clear, metallic, or light toner printer may allow the conversion of a CMYK machine with or without separate toner and drum cartridges.

Regarding the conversion of a CMYK machine with separate toner cartridges, the conversion may include replacing one of the color cartridges with a non-standard toner cartridge and replacing the accompanying color drum with a non-standard drum.

FIG. 1 is a flow block diagram of one embodiment of a method of converting a CMYK standard color printer to a CMYW converted white printer. As shown in FIG. 1, the conversion method 100 may comprise providing a CMYK printer 105 with four toner cartridges: cyan toner cartridge, magenta toner cartridge, yellow toner cartridge, and black (k) toner cartridge, and four toner cartridge slots: toner cartridge slot one, toner cartridge slot two, toner cartridge slot three, and toner cartridge slot four. Preferably, the CMYK printer is an LED toner printer.

In one embodiment, the black toner cartridge may be in toner cartridge slot one. Method 100 may further comprise removing the black toner cartridge from the printer 110. Toner cartridge slot one may now be empty toner cartridge slot one. Method 100 may further comprise: providing a white toner cartridge and/or Fluorescent white toner cartridge 115; installing the white toner cartridge or fluorescent white toner cartridge into empty toner cartridge slot one of the CMYK printer 120; and providing a raster image processor (RIP) software for toner cartridge remapping 125. The CMYK standard color printer is configured to incorporate the white toner into one or more images printed by the CMYK Standard Color Printer in a single pass and such that a CMYW converted white printer is created.

The white toner cartridge may be provided by disassembling the removed toner cartridge, emptying, and cleaning the removed printing cartridge to create an empty toner cartridge, and then filling the empty toner cartridge with a white toner.

The installation may be of a used or new toner cartridge.

Regarding the RIP software, the RIP software utilizes toner cartridge mapping to enable the ability to move, change, or swap toner cartridge locations in the printer. Toner cartridge mapping allows white underprinting in a single pass. The RIP software may also add a customizable separate layer of white underneath the image. This fully customizable feature in the software (RIP) allows users to reconfigure the printer to get almost any desired effect.

The RIP software may be configured to print black ("CMY Black") using a combination of the cyan toner cartridge, magenta toner cartridge, and yellow toner cartridge. The RIP software may also be configured to allow the user to print in full color using CMY Black and white, such that the white prints with the other colors simultaneously and seamlessly in a single layer.

The modified printer may be converted back to a CMYK printer by removing the white toner cartridge from toner cartridge slot one in the CMYK printer and re-installing the black toner cartridge (or installing a new black toner cartridge) into the toner cartridge slot one.

The CMYK standard color printer may be a printer selected from the group of printers comprising the following RICOH® printers: M C250FW, M C250FWB, P C311W, and M C251FW.

Figure 2:
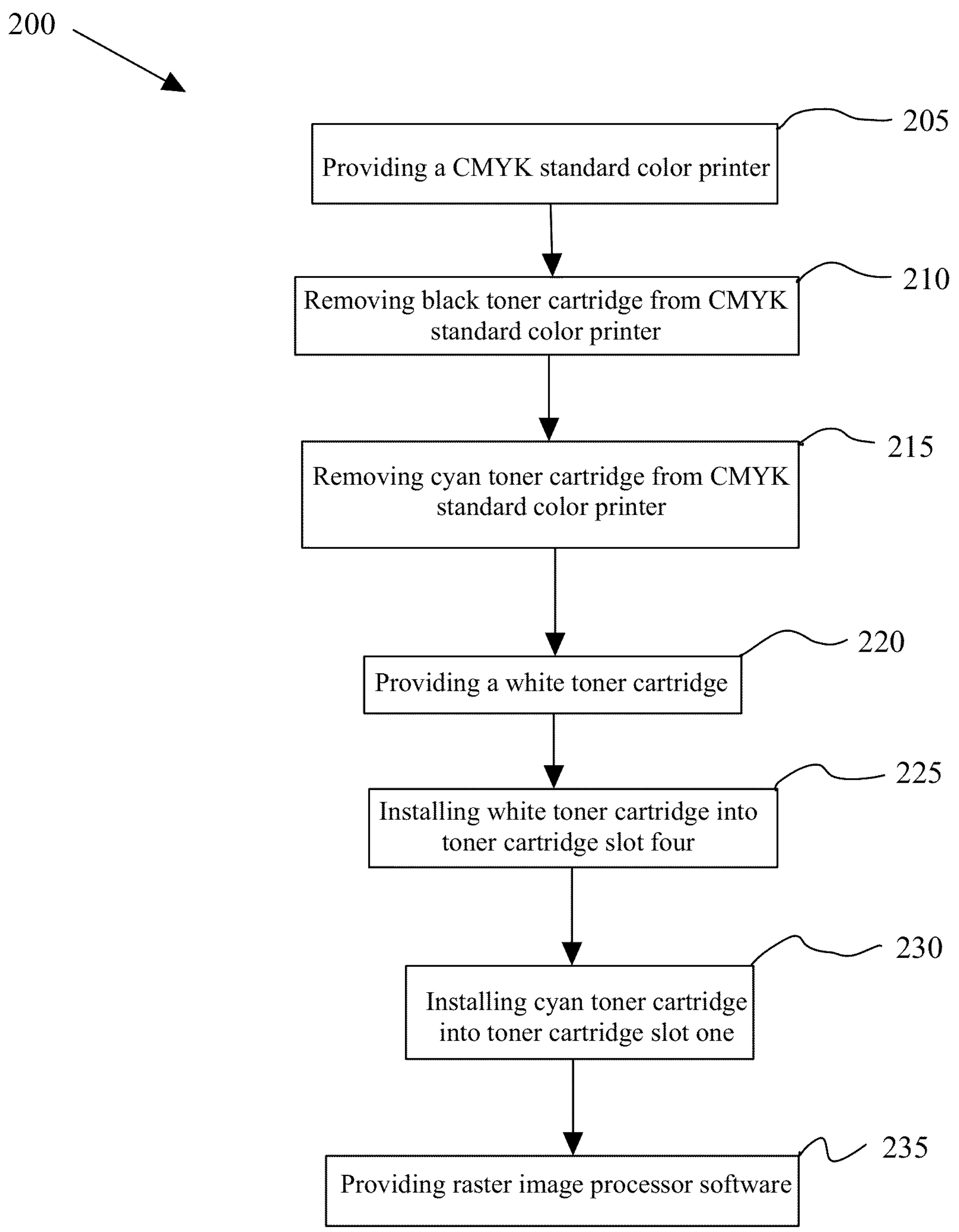
FIG. 2 is a flow block diagram of another embodiment of a method of converting a CMYK standard color printer to a WMYC converted white printer.

FIG. 2 is a flow block diagram of another embodiment of a method of converting a CMYK standard color printer to a WMYC converted white printer. As shown in FIG. 2, the conversion method 200 may comprise providing a CMYK printer 205 with four toner cartridges: cyan toner cartridge, magenta toner cartridge, yellow toner cartridge, and black (k) toner cartridge, and four toner cartridge slots: toner cartridge slot one, toner cartridge slot two, toner cartridge slot three, and toner cartridge slot four. In one embodiment, the black toner cartridge may be in the toner cartridge slot one, and the cyan toner cartridge may be in toner cartridge slot four. Method 200 may further comprise removing black toner cartridge 210 from the printer and removing the cyan toner cartridge from the printer 215. Method 200 may further comprise: providing a white toner cartridge 220; installing the white toner cartridge into toner cartridge slot four 225, which previously housed the cyan toner cartridge; installing the cyan toner cartridge into toner cartridge slot one in the printer 230, which previously housed the black (k) toner cartridge; and providing raster image processor (RIP) software for toner cartridge remapping 235.

The combination of the white toner cartridge being in toner cartridge slot four, the cyan toner cartridge in toner cartridge slot one, and the programming of the RIP software allows the user to incorporate white toner into one or more images printed by the CMYK Standard Color Printer in a single pass and such that a WMYC Converted White Printer is created. The white toner cartridge may be provided by disassembling the black removed toner cartridge, emptying, and cleaning the black removed toner cartridge to create an empty toner cartridge, and then filling the empty toner cartridge with white toner.

This method may also be used to create images that have spot white. When white is printed as a separate layer after the other colors have been printed, spot white may be printed around the first layer to produce white as a finished color. Traditional printers without specialized software take all white colors as a "page is white" and ignore the request to print in white. Traditional printers consider anything white as the color of the paper and do not print anything in the white areas. When a user creates a spot white in a graphic to be printed, the present printer RIP software recognizes this as a printable color and prints using the white toner.

The white toner cartridge may be provided by disassembling the removed toner cartridge, emptying, and cleaning the removed toner cartridge to create an empty toner cartridge, and then filling the empty toner cartridge with a white toner.

The installation may be of a used or new toner cartridge.

Regarding the RIP software, the RIP software utilizes toner cartridge mapping to enable the ability to move, change, or swap toner cartridge locations in the printer. Toner cartridge mapping allows white overprinting in a single pass. The RIP software may also add a customizable separate layer of white above the image. This fully customizable feature in the software (RIP) allows users to reconfigure the printer to get almost any desired effect.

The RIP software may be configured to print black ("CMY Black") using a combination of the cyan toner cartridge, magenta toner cartridge, and yellow toner cartridge. The RIP software may also be configured to allow the user to print in full color using CMY black and white, such that the white prints with the other colors simultaneously in a single layer. Preferably, the single layer is put down in a single pass.

The modified printer may be converted back to print with CMYK by removing the white toner cartridge and cyan toner cartridge from toner cartridge slot four and toner cartridge slot one, respectively, in the CMYK printer and re-installing the cyan toner cartridge and black toner cartridge into their original positions.

The CMYK Standard Color Printer may be a printer selected from the group of printers comprising the following RICOH® printers: M C250FW, M C250FWB, P C311W, and M C251FW.

Figure 3:
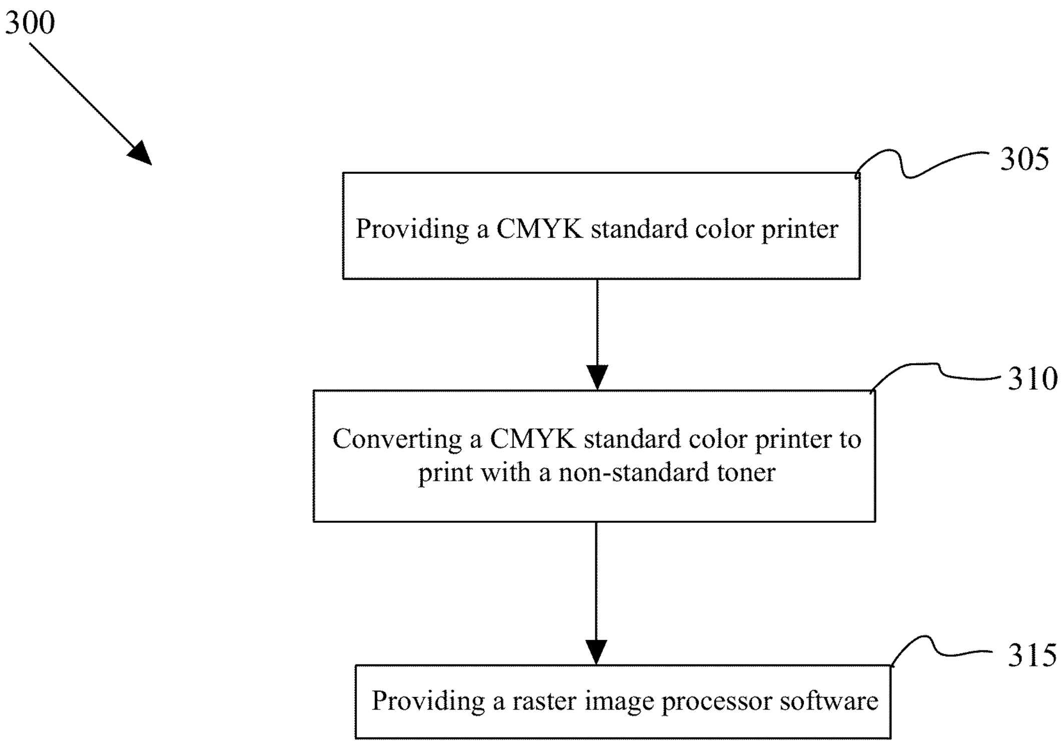
FIG. 3 is a flow block diagram of another embodiment of a method of converting a printer to print with a non-standard toner, such as white, clear, fluorescent, dye sublimation, metallic, and security.

FIG. 3 is a flow block diagram of another embodiment of a method of converting a printer to print with a non-standard toner, such as white, clear, fluorescent, dye sublimation, metallic, and security. FIG. 3 shows that the toner cartridge conversion method 300 may comprise the steps: providing a CMYK standard color printer 305, converting a CMYK standard color printer to print with a non-standard toner 310, and providing a raster image processor (RIP) software 315. Step 305 may be providing a CMYK printer with separate toner cartridges. The next step in converting a CMYK standard color printer to print with a non-standard toner 310 may include removing the black (or k) toner cartridge and/or removing the cyan toner cartridge from the printer, providing aftermarket empty toner cartridges, referred to as replacement toner cartridges, filling the toner cartridge with white, clear, metallic, fluorescent, clear fluorescent, or light toner, and installing the filled replacement toner cartridges into toner cartridge slot one or toner cartridge slot four in the printer.

These replacement toner cartridges may be new or recycled/repaired/refurbished.

Generally, fluorescent toners are only visible under ultraviolet (UV) light.

Regarding the RIP software, the RIP software utilizes toner cartridge mapping to enable the ability to physically move, change, or swap toner cartridges within the toner cartridge slots of the printer. Toner cartridge mapping allows white (or other non-standard toner) overprinting and underprinting in a single pass and allows the converted printer to switch back and forth to be a normal CMYK printer, a WMYC underprinting printer, and a CMYW overprinting printer. The RIP software may also add a customizable separate, second pass, layer of white (or other non-standard toner) on top of the image printed in the first pass. This fully customizable feature in the software (RIP) allows users to configure and reconfigure the printer to get almost any desired effect.

The RIP software may be configured to print black ("CMY Black") using a combination of the cyan toner cartridge, magenta toner cartridge, and yellow toner cartridge. The RIP software may also be configured to allow the user to print in full color using CMY Black and white, such that the white prints with the other colors at the same time in a single layer. Preferably, the single layer is put down in a single pass.

The converted printer may be configured to be a traditional CMYK printer by removing the white toner cartridge and cyan toner cartridge from toner cartridge slot four and toner cartridge slot one in the CMYK printer and re-installing the cyan toner cartridge and black toner cartridge into their original positions.

A CMYK Standard Color Printer may be a printer selected from the group of printers consisting of the following RICOH® printers: M C250FW; M C250FWB; P C311W; and M C251FW.

Figure 4:
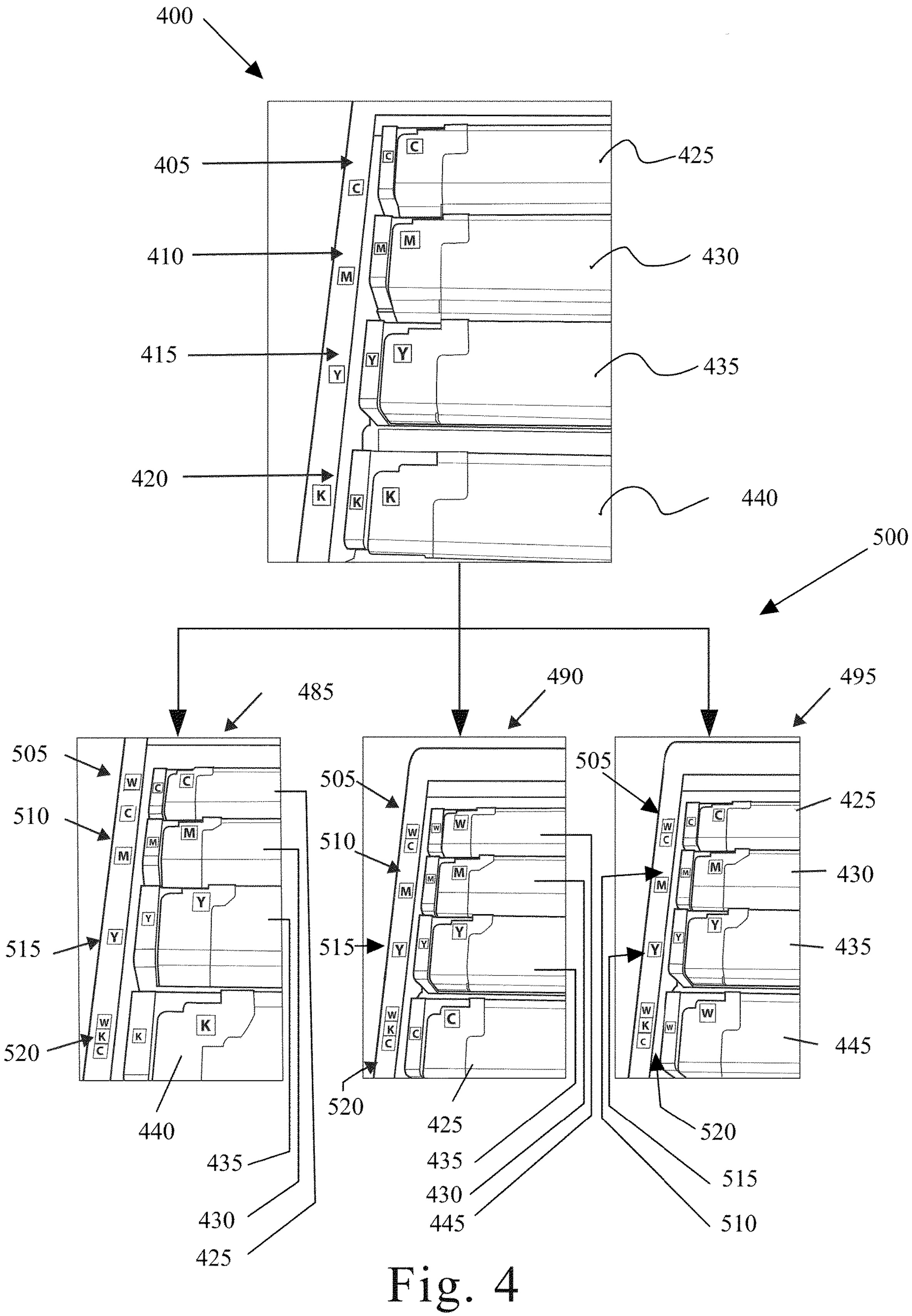
FIG. 4 is an illustration of one embodiment of the CMYK standard color printer and one embodiment of the converted white printer, shown in three configurations.

FIG. 4 is an illustration of one embodiment of the CMYK standard color printer and one embodiment of the converted white printer, shown in three configurations. As shown in FIG. 4, the CMYK Standard Color Printer 400 has a cyan toner cartridge 425, magenta toner cartridge 430, yellow toner cartridge 435, and black (k) toner cartridge 440. They are designed to be installed into toner cartridge slot one 420, toner cartridge slot two 415, toner cartridge slot three 410, and toner cartridge slot four 405. Toner cartridge slot four 405 may be configured to accept cyan toner cartridge 425 or white toner cartridge 445. Toner cartridge slot one 420 may be configured to accept cyan toner cartridge 425, black (k) toner cartridge 440, or white toner cartridge 445. Slot four 405 may also referred to as the front cartridge slot or the fourth toner cartridge slot. Slot one 420 may also be referred to as the back cartridge slot or the first toner cartridge slot. Toner cartridge slot three 410 may be referred to as the third toner cartridge slot. Toner cartridge slot two 415 may be referred to as the second toner cartridge.

FIG. 4 shows how CMYK Standard Color Printer 400 is converted to Converted White Toner Printer 500, which may preferably have three operating configurations: CMYK configuration 485, WMYC configuration 490, and CMYW configuration 495. FIG. 4 shows that, once converted, Converted White Toner Printer 500 has four toner cartridge slots: first toner cartridge slot 520 (the front slot), second toner cartridge slot 515, third toner cartridge slot 510, and fourth toner cartridge slot 505 (the back or last slot).

Fourth toner cartridge slot 505 may preferably be configured to accept and interchangeably use, white toner cartridge 445 or cyan toner cartridge 425. Third toner cartridge slot 510 is configured to accept magenta toner cartridge 430. Second toner cartridge slot 515 is configured to accept yellow toner cartridge 435. First toner cartridge printer slot 520 is configured to accept and use, interchangeably, white toner cartridge 445, cyan toner cartridge 425, or black toner cartridge 440.

In WMYC configuration 490 white toner cartridge 445 is installed in toner cartridge slot four 505. The magenta toner cartridge 430 is preferably dedicated to toner cartridge slot three 510. The yellow toner cartridge 435 is preferably dedicated to toner cartridge slot two 515. Toner cartridge slot one 520 is configured to accept cyan toner cartridge 425, and cyan cartridge 425 may be installed in toner cartridge slot one 420. In some embodiments, the white toner cartridge 445 may be replaced by a clear or other non-standard toner cartridge.

When Converted White Toner Printer is in the WMYC configuration 490 cyan toner cartridge 425 is installed in toner cartridge slot four 505, magenta toner cartridge 430 is installed into toner cartridge slot three 510, yellow toner cartridge 435 is installed into toner cartridge slot two 515, and black (k) toner cartridge 440 is installed into toner cartridge slot one 520.

When Converted White Toner Printer 500 is in the CMYW configuration 495, cyan toner cartridge 425 is installed into toner cartridge slot four 505, magenta toner cartridge 430 is preferably dedicated to toner cartridge slot three 510, the yellow toner cartridge 435 is preferably dedicated to toner cartridge slot two 515, and white toner cartridge 445 is installed in toner cartridge slot one 520. In some embodiments, the white toner may be replaced by a clear or another type of non-standard toner.

Even after the conversion is done, the Converted White Printer 500 may be switched back to have CMYK configuration 485 by installing cyan toner cartridge 425 into toner cartridge slot four 505, magenta toner cartridge into toner cartridge slot three 510, yellow toner cartridge 435 into toner cartridge slot two 515, and black (k) toner cartridge 440 into toner cartridge slot one 520.

The WMYC configuration 490 may be used when the printer 500 is needed to underprint with white by printing first with white toner cartridge 445 in toner cartridge slot four 505, second with magenta toner cartridge 430 in toner cartridge slot three 510, third with yellow toner cartridge 435 in toner cartridge slot two 515 and finally with cyan cartridge 425 in toner cartridge slot one 420. The RIP software allows the printer 500 to recognize that the white toner cartridge 445 is in the fourth toner cartridge slot 505. Recognition that white toner cartridge 445 is in the fourth cartridge slot 505 allows white toner cartridge 445 to be incorporated into the image and/or be printed over the image in one pass.

The CMYW configuration 495 may be used when the printer 500 is needed to overprint with white by printing first with cyan toner cartridge 425 in toner cartridge slot four 505, second with magenta toner cartridge 430 in toner cartridge slot three 510, third with yellow toner cartridge 435 in toner cartridge slot three 515, finally with white toner cartridge 445 in toner cartridge slot one 520. The RIP software allows the printer 500 to recognize that the white toner cartridge 445 is in toner cartridge slot one 420. This allows white toner cartridge 445 to be incorporated into the image and or be printed under the image in one pass.

In other embodiments, the CMYK Standard Color Printer 400 may be: 1) converted to print using dye sublimation toners; 2) converted to print using fluorescent toners; 3) converted to print with clear (instead of white) for both overprinting and underprinting in one pass; 4) converted to print with metallic (such as gold or silver) (instead of white); and converted to print using security toner.

All of these embodiments may comprise the method of providing a CMYK Standard Color Printer and removing the black toner and drum and placing it aside. For providing a standard CMYW Converted White Printer, the cyan toner/drum is removed and installed in the first slot (where black used to be). The white toner cartridge, which is configured to fit into the slot where the cyan was removed from, is inserted into the last or cyan slot. This is also the configuration for overprinting.

For clear or fluorescent clear, the clear or fluorescent clear toner/drum is used instead of the white toner cartridge 445 (in toner cartridge slot four 405 or toner cartridge slot one 420 depending on whether overprinting or underprinting is desired.

For a sublimation conversion, the CMYK toners of the CMYK Standard Color Printer 400 are swapped out for dye sublimation toners.

For metallic printing, the black of the CMYK Standard Color Printer is replaced with the metallic toner.

For security toner printing, any of the toners of the CMYK Standard Color Printer is replaced with a security toner.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g., circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A method of converting a CMYK Standard Color Printer to be a CMYW Converted White Printer, comprising the steps:

providing a CMYK Standard Color Printer; wherein the CMYK Standard Color Printer comprises: a black toner cartridge; wherein the black toner cartridge is installed in a first toner cartridge slot;

removing the black toner cartridge from the CMYK Standard Color Printer, such that the first toner cartridge slot is empty;

providing a white toner cartridge; installing the white toner cartridge into the empty first toner cartridge slot one; and providing raster image processor (RIP) software, such that the CMYK Standard Color Printer is configured to incorporate a white toner into one or more images printed by the CMYK Standard Color Printer in a single pass and such that a CMYW Converted White Printer is created;

wherein the CMYK Standard Color Printer is a printer selected from the group of printers consisting of: Ricoh® M C250FW, Ricoh® M C250FWB, Ricoh® P C311W, and Ricoh® M C251FW.

2. The method of claim 1, wherein the CMYK Standard Color Printer further comprises:

four toner cartridges; and four toner cartridge slots;

wherein the four toner cartridge slots comprise the first toner cartridge slot, a second toner cartridge slot, a third toner cartridge slot, and a fourth toner cartridge slot;

wherein the four toner cartridges comprise the black toner cartridge, a cyan toner cartridge, a magenta toner cartridge, and a yellow toner cartridge.

3. The method of claim 2, wherein the cyan toner cartridge is installed in the fourth toner cartridge slot, the magenta toner cartridge is installed in the third toner cartridge slot, the yellow toner cartridge is installed in the second toner cartridge slot.

4. The method of claim 3, wherein the RIP software allows a black color to be printed using a combination of the cyan toner cartridge, the magenta toner cartridge, and the yellow toner cartridge.

5. The method of claim 1, wherein the RIP software allows for remapping of the CMYK Standard Color Printer.

6. The method of claim 1, wherein the CMYW Converted White Printer is configured to print a layer of the white toner under the one or more images printed in a single pass.

7. A method of converting a CMYK Standard Color Printer to be a WMYC Converted White Printer, comprising the steps:

providing a CMYK Standard Color Printer;

wherein the CMYK Standard Color Printer comprises: a black toner cartridge and a cyan toner cartridge;

wherein the cyan toner cartridge is installed in a fourth toner cartridge slot and the black toner cartridge is installed in a first toner cartridge slot;

removing the black toner cartridge from the CMYK Standard Color Printer, such that the first toner cartridge slot is empty;

removing the cyan toner cartridge from the CMYK Standard Color Printer, such that the fourth toner cartridge slot is empty;

providing a white toner cartridge;

installing the white toner cartridge into the empty fourth toner cartridge slot;

installing the cyan toner cartridge into the empty first toner cartridge slot; and providing raster image processor (RIP) software, such that the CMYK Standard Color Printer is configured to incorporate a white toner into one or more images printed by the CMYK Standard Color Printer in a single pass and such that a WMYC Converted White Printer is created;

wherein the CMYK Standard Color Printer is a printer selected from the group of printers consisting of: Ricoh® M C250FW, Ricoh® M C250FWB, Ricoh® P C311W, and Ricoh® M C251FW.

8. The method of claim 7, wherein the CMYK Standard Color Printer further comprises:

four toner cartridges; and four toner cartridge slots;

wherein the four toner cartridge slots comprise the first toner cartridge slot, a second toner cartridge slot, a third toner cartridge slot, and the fourth toner cartridge slot;

wherein the four toner cartridges comprise the black toner cartridge, the cyan toner cartridge, a magenta toner cartridge, and a yellow toner cartridge.

9. The method of claim 8, wherein the magenta toner cartridge is installed in the third toner cartridge slot, the yellow toner cartridge is installed in the second toner cartridge slot.

10. The method of claim 8, wherein the RIP software allows a black color to be printed using a combination of the cyan toner cartridge, the magenta toner cartridge, and the yellow toner cartridge.

11. The method of claim 8, wherein the CMYW Converted White Printer is configured to print a layer of the white toner over the one or more images printed in a single pass.

12. The method of claim 7, wherein the RIP software allows for remapping of the CMYK Standard Color Printer.

13. A method of converting a CMYK Standard Color Printer, comprising the steps:

providing a CMYK Standard Color Printer;

converting the CMYK Standard Color Printer to print with a non-standard toner; and providing raster image processor (RIP) software, such that the CMYK Standard Color Printer is configured to incorporate the non-standard toner into one or more images printed by the CMYK Standard Color Printer in a single pass.

14. The method of claim 13, wherein the non-standard toner is selected from the group of toners consisting of: clear; fluorescent clear; dye sublimation; metallic; and security.

15. The method of claim 13, wherein the RIP software allows for remapping of the CMYK Standard Color Printer.

16. The method of claim 13, wherein the RIP software allows a black color to be printed using a combination of the cyan toner cartridge, the magenta toner cartridge, and the yellow toner cartridge.

17. The method of claim 13, wherein the CMYK Standard Color Printer is a printer selected from the group of printers consisting of: Ricoh® M C250FW, Ricoh® M C250FWB, Ricoh® P C311W, and Ricoh® M C251FW.

* * * * *